(12) United States Patent
Kashima

(10) Patent No.: US 6,417,831 B2
(45) Date of Patent: *Jul. 9, 2002

(54) DIFFUSED LIGHT CONTROLLING OPTICAL SHEET, BACK LIGHT DEVICE AND LIQUID CRYSTAL DISPLAY APPARATUS

(75) Inventor: Keiji Kashima, Shinjuku-ku (JP)

(73) Assignee: Dai Nippon Printing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,295

(22) Filed: Mar. 5, 1998

(30) Foreign Application Priority Data

Mar. 6, 1997 (JP) .............................. 9-051654

(51) Int. Cl.$^7$ .................................... G09G 3/36
(52) U.S. Cl. ........................ 345/102; 349/57; 349/62; 349/65
(58) Field of Search ................. 345/102, 151, 345/5, 9; 349/62, 65, 95, 57

(56) References Cited

U.S. PATENT DOCUMENTS

| 5,089,944 | A | * | 2/1992 | Oe et al. ..................... 362/224 |
| 5,151,801 | A | * | 9/1992 | Hiroshima ..................... 349/95 |
| 5,592,332 | A | * | 1/1997 | Nishio et al. ................ 359/619 |
| 5,612,432 | A | * | 3/1997 | Taniguchi et al. ........... 526/262 |
| 5,724,182 | A | * | 3/1998 | Mitani et al. ................ 359/457 |
| 5,729,306 | A | * | 3/1998 | Miyake et al. .................. 349/9 |
| 5,745,199 | A | * | 4/1998 | Suzuki et al. ................. 349/95 |
| 5,764,315 | A | * | 6/1998 | Yokota et al. ................ 349/62 |
| 5,940,149 | A | * | 8/1999 | Vanderwerf .................... 349/5 |

FOREIGN PATENT DOCUMENTS

| JP | A-63-318008 | 12/1988 |
| JP | A-64-37801 | 2/1989 |
| JP | A-2-84618 | 3/1990 |
| JP | A-2-257188 | 10/1990 |
| JP | A-3-69184 | 3/1991 |
| JP | A-6-148408 | 5/1994 |

* cited by examiner

*Primary Examiner*—Dennis-Doon Chow
*Assistant Examiner*—Alecia D. Nelson
(74) *Attorney, Agent, or Firm*—Oliff & Berridge, PLC

(57) ABSTRACT

A diffused light controlling optical sheet to be used in a back light device of a liquid crystal display apparatus, wherein convex parts are provided at the opposite side to its light receiving surface and a tangential line on a side face of the convex part makes an angle of 60 to 90 degrees with the light receiving surface, and a fine material which is slightly different in refractive index from a material forming the sheet is contained inside the convex parts and thereby a diffused light inputted through the light receiving surface is converted to a diffused light of intense directivity.

19 Claims, 5 Drawing Sheets

DIFFUSED LIGHT CONTROLLING OPTICAL SHEET, BACK LIGHT DEVICE AND LIQUID CRYSTAL DISPLAY APPARATUS

BACKGROUND OF THE INVENTION

1. Field of the Invention

The present invention relates to a diffused light controlling optical sheet suitable for use in controlling a back light in a liquid crystal display, a liquid crystal color television set and the like, and relates to a back light device and a liquid crystal display apparatus which use the same optical sheet.

2. Prior Art

Up to now, there has been a back light device for irradiating light on the back of a liquid crystal display apparatus in order to improve the visibility of a liquid crystal display screen.

In order to improve the illumination efficiency of an illumination light (back light) from such a back light device, it is necessary to improve the directivity of the illumination light (back light) toward a user.

However, in case that the directivity of an illumination light (output light) is too intense, there is a problem that the angle of view becomes very narrow and the brightness of a screen is sharply reduced by just slightly moving user's point of view.

In order to cope with such a problem as this, as disclosed in a Japanese laid-open publication Tokkaihei No. 6-148408 for example, a light control sheet has been proposed which is provided with both of an optical condensability for giving a sufficient brightness in the direction of illumination and an optical diffusibility for bringing a uniformly bright visibility within a certain range of the angle of view.

This light control sheet has one face which is a structural surface having macroscopically a regularly-wavy corrugated pattern or a corrugated pattern in which a number of ridges each of which has a substantially triangle-shaped cross section are formed in parallel with one another and microscopically a corrugated pattern which a fine-granulation process or a light-diffusion coating process is applied to, and the other face which has an optical plane or a plane to which a fine-granulation process is applied.

A light control sheet disclosed in the above-mentioned Japanese laid-open publication Tokkaihei No. 6-148408 has a problem that its optical diffusion effect given by a surface granulation process or coating process is excessive and the directivity of its output light is deteriorated.

In addition to this, a technique of outputting a light of directivity by applying a refractive effect of a sheet whose cross section is of a triangular-prism shape has been disclosed in a Japanese laid-open publication Tokkaisho No. 63-318008 and similar technical ideas have been disclosed in Japanese laid-open publications Tokkaihei No. 2-257188 and Jikkaihei No. 3-69184 and moreover as a method for further enhancing the directivity of an output light a method of using two corrugated sheets has been disclosed in a Japanese patent publication Tokkouhei No. 1-37801.

However, any of techniques disclosed in the above-mentioned Japanese laid-open publications Tokkaisho No. 63-318008, Tokkaihei No. 2-257188 and Jikkaihei No. 3-69184, and Japanese patent publication Tokkouhei No. 1-37801 has a problem that it cannot sufficiently enhance the directivity of an output light and cannot control a direction showing the peak in directivity.

As disclosed in a Japanese laid-open publication Tokkaihei No. 2-84618, there is a method of applying the total reflection of a film having triangular prisms in cross section as a method for controlling a direction showing the peak in directivity of an output light.

However, this method is a method of outputting at a specific angle only a light ray inputted at a specific angle, and has a problem that the incident angle of a light ray is limited and it does not control the directivity itself of a diffused light and therefore cannot control at the same time a direction showing the peak in directivity of a diffused light and the directivity itself of the diffused light.

SUMMARY OF THE INVENTION

The present invention has been developed in consideration of the above-mentioned problems, and an object of the present invention is to provide a diffused light controlling optical sheet, a back light device and a liquid crystal display apparatus which make it possible to further enhance the directivity of a diffused light generated by diffusing an output light and to control a direction showing the peak in directivity of the diffused light.

The present invention achieves the above-mentioned object by using a diffused light controlling optical sheet which is made of a light-transmissive material and has at one side a light receiving surface of a plane shape and at the other side a serrulated surface which has a plurality of convex parts for converting a light inputted through the said light receiving surface to a diffused light of intense directivity and in which each of the said convex parts is provided with side faces extending from its top to its bottom and each of said side faces of said convex part is formed into a plane making an angle of 60 to 90 degrees with the said light receiving surface.

Said diffused light controlling optical sheet may have a fine material, which is slightly different in refractive index from said light-transmissive material, disposed in said convex parts and may have a light diffusion effect by means of a refractivity difference between said fine material and said light-transmissive material.

Said diffused light controlling optical sheet may have said fine material which is in particle diameter more than 0.5 $\mu$m and less than 10 $\mu$m, and preferably 1 $\mu$m or more and 5 $\mu$m or less.

Said diffused light controlling optical sheet may have said convex part provided with said side faces of fine ruggedness.

Said diffused light controlling optical sheet may have said convex part, wherein the centerline average roughness of said fine ruggedness is 0.5 $\mu$m or more and less than 10 $\mu$m, preferably 1 to 5 $\mu$m, and more preferably 2 to 3 $\mu$m.

Said diffused light controlling optical sheet may have said convex part provided with said side faces coated with a light diffusing material.

Said diffused light controlling optical sheet may have said light diffusing material comprises in a base a fine material which is different in refractive index from this base and is in particle diameter 0.5 $\mu$m or more and 10 $\mu$m or less, and preferably 1 to 5 $\mu$m.

Said diffused light controlling optical sheet may have said convex parts disposed at intervals of 1 to 500 $\mu$m.

Said diffused light controlling optical sheet may have said convex parts each top of which is in the shape of a plane parallel with said light receiving surface.

Said diffused light controlling optical sheet may have the top of said convex part made into a convex lens part.

Said diffused light controlling optical sheet may have said convex parts in which the half width of intensity of its output light is within an angle range of 24 degrees or less.

Said diffused light controlling optical sheet may have a fine material slightly different in refractive index from said light-transmissive material distributed inside said convex parts and a light diffusion effect is obtained by a refractivity difference between said fine material and said light transmissive material, and said side face of said convex part is provided with fine ruggedness.

Said diffused light controlling optical sheet may have said convex parts disposed at intervals of 1 to 500 μm.

Said diffused light controlling optical sheet may have a fine material slightly different in refractive index from said light-transmissive material distributed inside said convex parts and a light diffusion effect is obtained by said refractivity difference between said fine material and said light-transmissive material, and a light diffusing material is coated on said side faces of said convex parts.

And the present invention achieves the above-mentioned objects by means of a back light device which is provided with a plane-shaped light source and has said diffused light controlling optical sheet arranged so that its light receiving surface faces the light outputting surface of said plane-shaped light source with an air layer between them.

Furthermore, the present invention achieves the above-mentioned objects by means of a liquid crystal display apparatus which is provided with such a back light device as described above and uses a light outputted from said back light device as a back light.

In the present invention, since each side face of the convex parts at the light outputting side of the diffused light controlling optical sheet is made into a plane making an angle of 60 to 90 degrees with said light receiving surface, a light inputted through the light receiving surface is intensely refracted in the front direction and thereby the directivity of an output light can be enhanced.

DETAILED DESCRIPTION OF THE PREFERRED EMBODIMENTS

Figure 1:
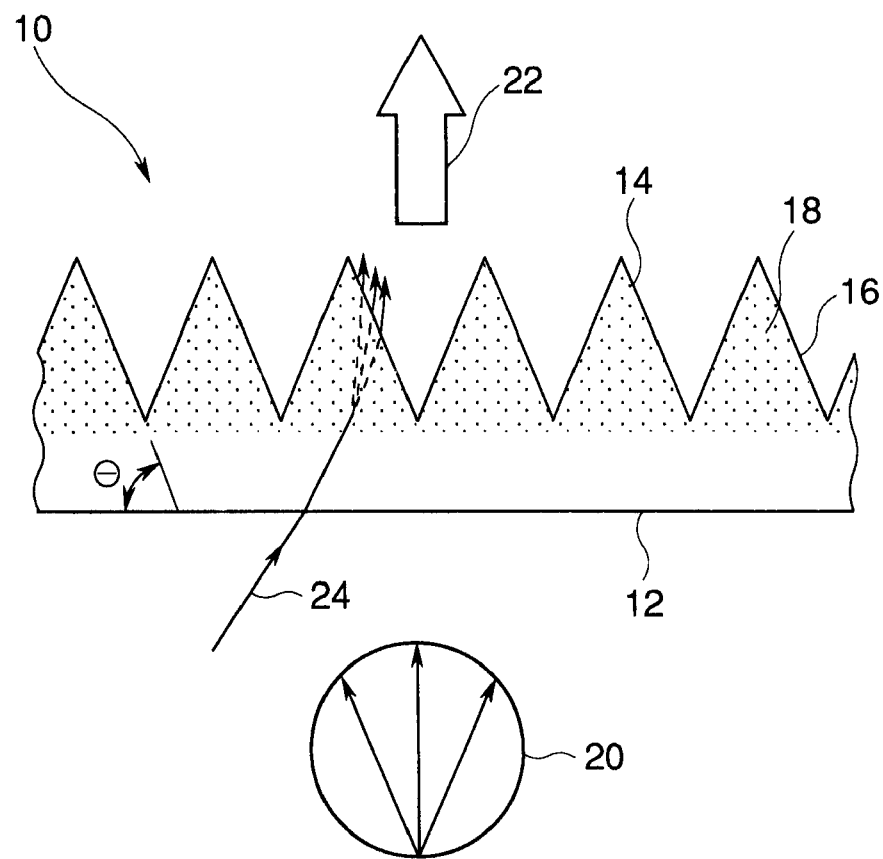
FIG. 1 is an enlarged sectional view showing a first example of embodiments of a diffused light controlling optical sheet according to the present invention.

Embodiments of the present invention are described in detail with reference to the drawings in the following.

A diffused light controlling optical sheet 10 according to a first example of the embodiments of the present invention is made of a light-transmissive material such as transparent resin, glass, ceramic or the like, and has at one side of it a light receiving surface 12 of a plane shape and at the other side (upper side) a serrulated surface which has a plurality of convex parts (triangular prisms) 14, each of which is triangular in cross section, for converting a light inputted through the said light receiving surface 12 to a diffused light of intense directivity and in which each of the said convex parts 14 is provided with side faces 16 extending from its top to its base and each of said side faces 16 of said convex part 14 is formed into a plane making an angle ($\theta$) of 60 to 90 degrees (more preferably 70 to 90 degrees) with the said light receiving surface 12.

Said resin used as a light-transmissive material is composed of, for example, a single material or a copolymer of ester acrylate or ester metacrylate of methyl polymetacrylate, methyl polyacrylate or the like, or either of polyester of polyethylene terephthalate, polybutylene terephthalate or the like, polycarbonate or polystyren, or a combination of them.

In said convex part 14, a fine material 18 slightly different in refractive index from said light-transmissive material is disposed and a light diffusion effect is brought by a refractivity difference between said fine material 18 and said light-transmissive material.

As said fine material 18, acryl beads of 1.49 in refractive index are used, for example, in case that an ultraviolet-setting resin of 1.57 in refractive index is used as said light-transmissive material.

Hereupon, said fine material is in particle diameter preferably 0.5 μm or more in order to prevent an optical interference effect, and preferably 10 μm or less in order to control the direction of an output light. More preferably, a diffused light of more intense directivity can be obtained within a range of 1 to 5 μm in particle diameter of the fine material 18.

When a diffused light 20 is inputted into such a diffused light controlling optical sheet 10 as described above through the light receiving surface 12 at the lower side as shown in FIG. 1, a diffused light 22 more intensified in directivity is outputted through the convex part 14 as indicated by a symbol 22.

In FIG. 1, an arrow indicating a diffused light 20 schematically shows the intensity of a light ray with its length and the direction of progress of the light ray with its direction.

Similarly, an arrow indicating a diffused light 22 outputted from the convex part 14 also shows the intensity of a light ray with its length, and shows that the directivity of it is more intensified than the diffused light 20 at the input side.

Thanks to that the side face 16 of the convex part 14 makes said angle of "$\theta$=60 to 90 degrees" with said light receiving surface 12, a diffused light 20 incident on said light receiving surface 12 is led by an optical guide effect of said convex part 14, and even in case that the diffused light 20 is incident on the light receiving surface 12 at a slant angle as shown by a symbol 24 in FIG. 1, the diffused light is totally reflected by the side face 16 inside the convex part 14 as being diffused (scattered) by said fine material 18 existing inside the convex part 14 and its component bent intensely in the direction of a normal line standing on the light receiving surface 12 is increased, and the inputted diffused light 20 is outputted as said diffused light 22 of intense directivity through the convex part 14.

In case of such a diffused light controlling optical sheet according to the present invention, an angle between the direction of an output light and the tangential direction of the surface of the convex part is set as being in a range of 1 to 40 degrees and preferably in a range of 1 to 20 degrees, but in case of the present invention the direction of an output light outputted from the convex part 14 makes an angle of 1 to 20 degrees with a tangential line on the surface of it.

Although the diffused light controlling optical sheet 10 shown in FIG. 1 has the triangular-prism shaped convex parts in which a fine material 18 is distributed, the present invention is not limited to this but may be provided with convex parts at its light outputting side which are formed so that their side faces make an angle of 60 to 90 degrees with the light receiving surface.

Figure 2:
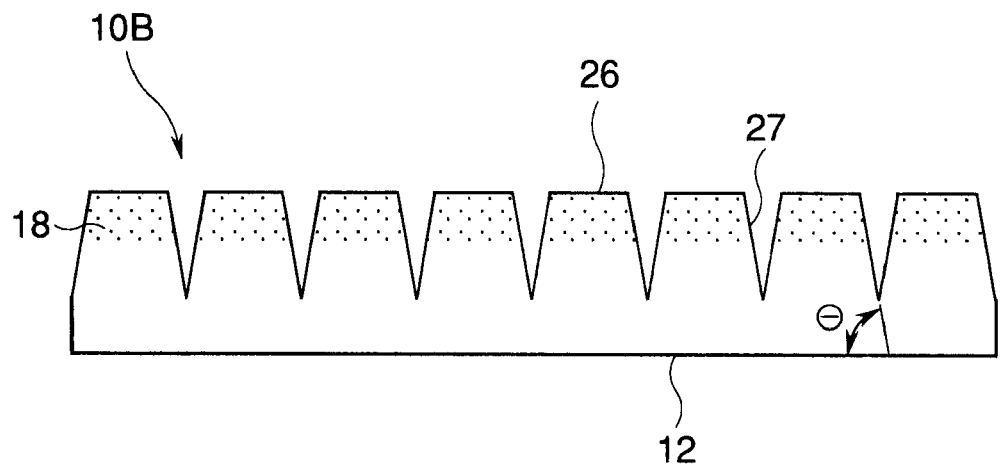
FIG. 2 is an enlarged sectional view showing a second example of the same embodiments.
Figure 3:
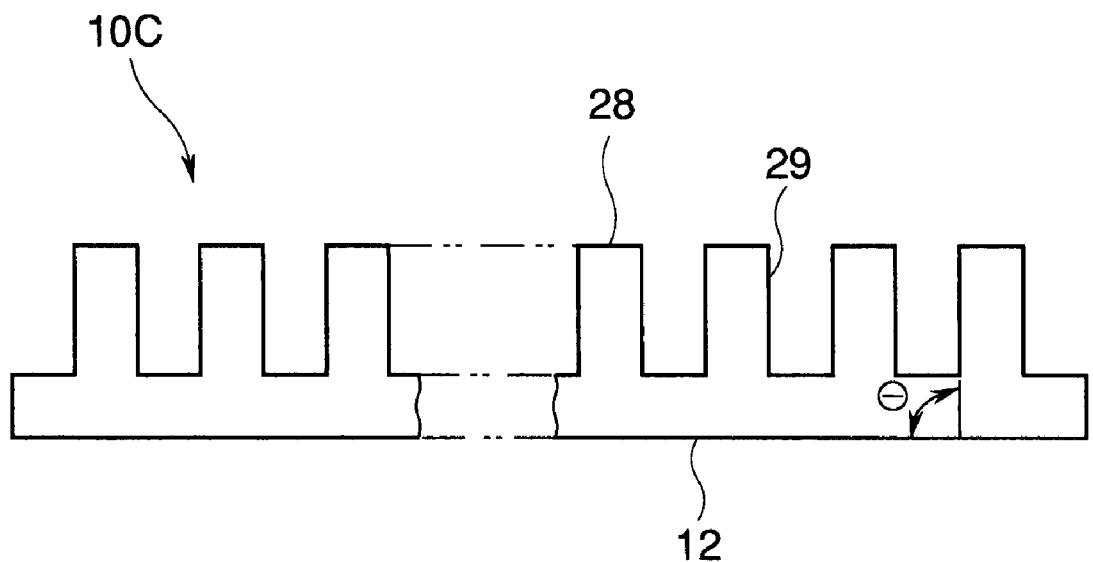
FIG. 3 is an enlarged sectional view showing a third example of the same embodiments.
Figure 4:
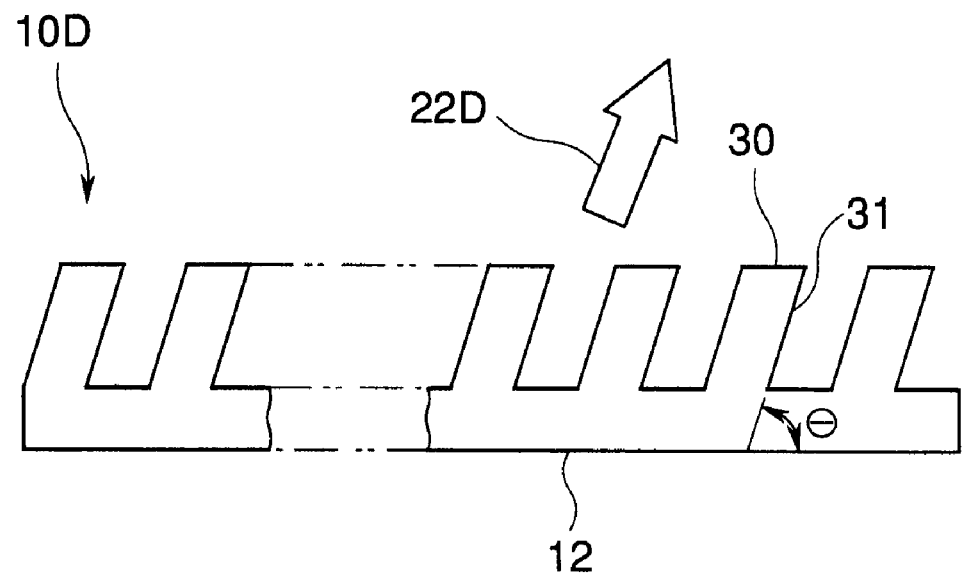
FIG. 4 is an enlarged sectional view showing a fourth example of the same embodiments.

The invention may use, for example, a diffused light controlling optical sheet 10B in whose cross section the convex parts 26 are in the shape of consecutive trapezoids as shown in FIG. 2, a diffused light controlling optical sheet 10C in whose cross section the convex parts 28 are in the shape of intermittently successive quadrangles as shown in FIG. 3, or a diffused light controlling optical sheet 10D in whose cross section the convex parts 30 are in the shape of intermittently successive parallelograms inclined in the same direction as shown in FIG. 4, or the like.

Any of these diffused light controlling optical sheets 10B to 10D has its convex parts 26 to 30 containing a fine material 18 in them in the same way as the diffused light controlling sheet 10 shown in FIG. 1 (the fine material 18 is not illustrated in FIGS. 3 and 4).

The side faces 27, 29 and 31 of the convex parts 26, 28 and 30 are formed so as to make an angle of "θ=60 to 90 degrees" with the light receiving surface 12.

These diffused light controlling optical sheets 10B to 10D can output an incident light coming in through the light receiving surface 12 from the convex parts 26, 28, 30 side as a diffused light of intense directivity in the same manner as said diffused light controlling optical sheet 10.

Particularly in the diffused light controlling optical sheet 10D of FIG. 4, since the convex part 30 is formed in the shape of a parallelogram inclined in the same direction, an output diffused light is intensely directed in the direction of inclination of the convex part 30, as shown by a symbol 22D in FIG. 4. That is to say, this optical sheet can control the directivity of an output diffused light.

Figure 5:
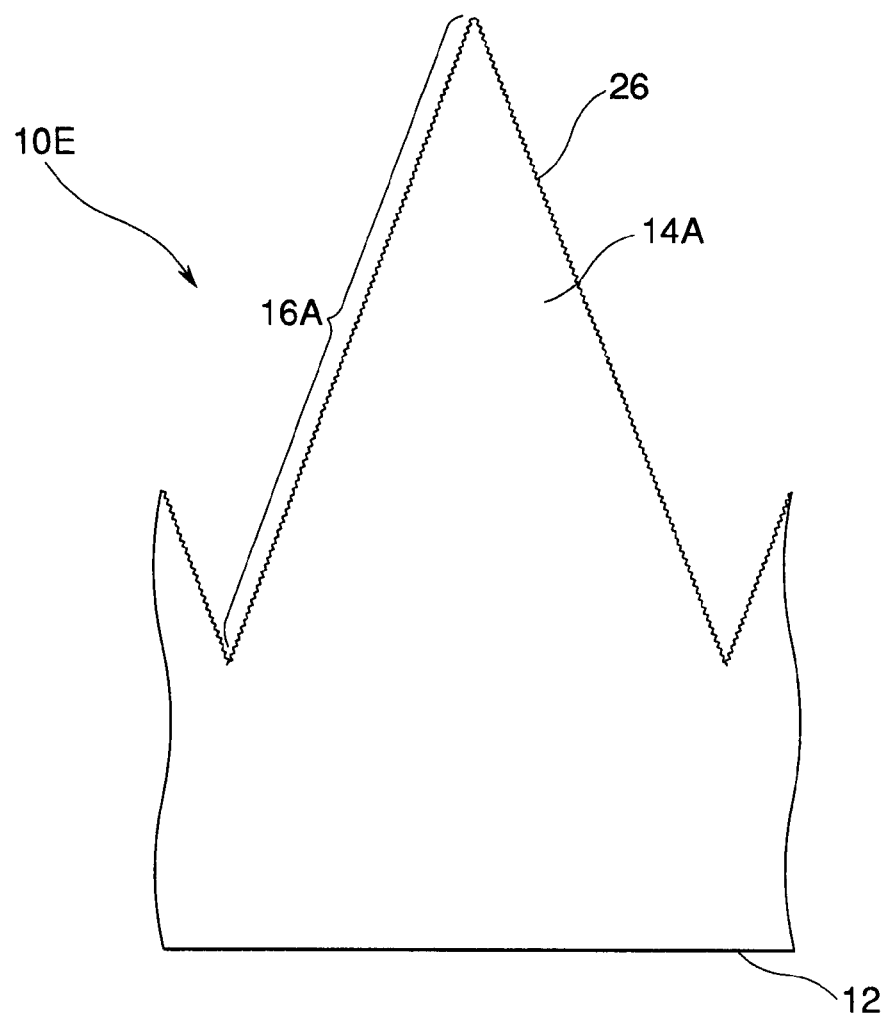
FIG. 5 is an enlarged sectional view showing a fifth example of the same embodiments.
Figure 6:
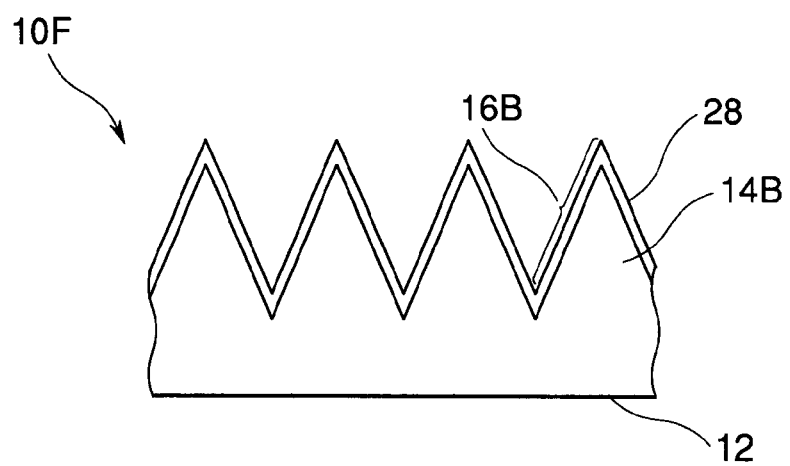
FIG. 6 is an enlarged sectional view showing a sixth example of the same embodiments.

Although any of the diffused light controlling optical sheets shown in FIGS. 1 to 4 contains a fine material 18 in its convex parts, this is satisfied by any method for giving a light diffusion effect to the convex part and therefore as shown in FIG. 5 or 6, it will do also to form fine ruggedness on the surface of the convex parts or coat a light diffusing material on the surface of the convex parts. In case of disposing a fine material inside the convex parts, however, an incident light can be more intensely diffused.

FIG. 5 shows a diffused light controlling optical sheet 10E provided with a convex part 14A of a triangular-prism shape in the same way as FIG. 1, in which the side face 16A of said convex part 14A has fine ruggedness 26 formed on it.

In this diffused light controlling optical sheet 10E, a light inputted through the light receiving surface 12 is intensely directed in the same direction at the convex part 14A, and is diffused by the fine ruggedness 26 when it is outputted through the side face 16A of said convex part 14A. Accordingly, a diffused light intense in directivity can be obtained.

Hereupon, the centerline average roughness Ra of said fine ruggedness 26 is preferably 0:5 $\mu$m or more in order to prevent an optical interference effect, and preferably less than 10 $\mu$m in order to efficiently obtain a diffusion effect. Furthermore, it is more preferably 1 to 5 $\mu$m and particularly preferably 2 to 3 $\mu$m.

A diffused light controlling optical sheet 10F shown in FIG. 6 is obtained by coating a light diffusing material 28 on the side face 16B of the convex part 14B of a triangular-prism shape similar to FIGS. 1 and 5.

This light diffusing material 28 has preferably a fine material different in refractive index from a base inside the coating layer; which is obtained by making a urethane resin (base) of 1.44 in refractive index contain acryl beads of 1.49 in refractive index, for example.

Hereupon, a fine material of acryl beads or the like in said light diffusing material 28 is preferably 0.5 $\mu$m or more in particle diameter in order to prevent an optical interference effect and preferably 10 $\mu$m or less in order to efficiently obtain a specific diffusion effect. The fine material in the light diffusing material 28 is more preferably 1 to 5 $\mu$m in particle diameter.

In this manner, a diffused light of intense directivity can be obtained. And an output light outputted from each of the side faces 16A and 16B of the convex parts 14A and 14B makes preferably an angle of 1 to 40 degrees with a tangential line on said side face and more preferably an angle of 1 to 20 degrees, and in case of forming such fine ruggedness 26 as described above and in case of coating the light diffusing material 28, a preferable output angle can be obtained.

Particularly, when a fine material of 1 $\mu$m or more and less than 2 $\mu$m in particle diameter contained in the light diffusing material 28 was used, an output light from the side face 16B of the convex part 14B made an angle of 1 to 20 degrees with a tangential line on said side face 16B.

Figure 7:
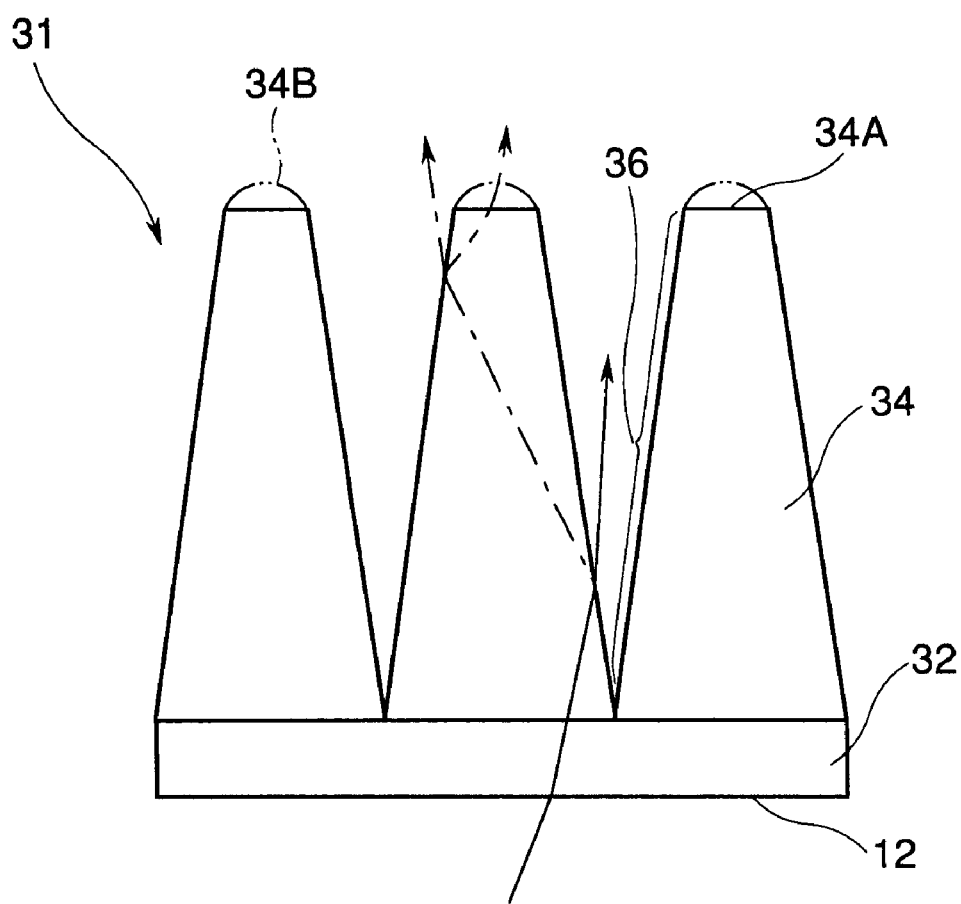
FIG. 7 is an enlarged sectional view showing a seventh example of the same embodiments.

Although in any of the diffused light controlling optical sheets shown in FIGS. 1 to 6 its light receiving surface and its convex parts are formed into one body, the present invention is not limited to this, but convex parts 34 may be formed on a base film 32 like a diffused light controlling optical sheet 31 shown in FIG. 7, for example.

In this case, such a diffused light controlling optical sheet can be comparatively easily manufactured in mass production by forming the convex parts 34 out of ultraviolet-setting resin on a light-transmissive resin film of polyethylene terephthalate (PET), polycarbonate (PC) or the like as the base film 32.

Hereupon, the base film 32 is preferably 50 to 500 $\mu$m in thickness and more preferably 100 to 250 $\mu$m in a viewpoint of easiness to manufacture and handle.

Since said convex parts 14, 14A, 14B, 26, 28 and 34 are formed so that a tangential line on each of their side faces makes an angle of 60 to 90 degrees with the light receiving surface 12, each convex part has an optical guide effect and can easily control an incident light so that the direction of an output light makes an angle of 1 to 40 degrees or preferably 1 to 20 degrees with a tangential line on the side face.

Since it is preferable to make as small as possible the interval between the convex parts of the above-mentioned diffused light controlling optical sheets 10, 10B to 10E and 31 so that the convex parts themselves cannot be perceived by human eyes, the interval is preferably 500 $\mu$m or less but is preferably 1 $\mu$m or more in order to prevent an optical interference effect.

In the above-mentioned diffused light controlling optical sheets shown in FIGS. 1 to 6, the height of a convex part is nearly equal to or less than 1.5 times of the width of its base, but when the height of the convex part 34 is made higher in comparison with its base (about 2.2 times higher in FIG. 7, but preferably 1.5 to 3.0 times higher) like the diffused light controlling optical sheet 31 shown in FIG. 7 for example, the directivity of an output light from said convex part 34 is more improved.

In this case, as shown in FIG. 7, when a light inputted through the light receiving surface 12 is outputted through the side face 36 of the convex part 34, it total-reflects partly and goes out from the side face 36 further ahead, and the residual light proceeds as total-reflecting and the inputted light mostly repeats reflection and partly repeats total reflection at plural times on the side face 36 and then goes out from it, and therefore the inputted light is substantially scattered inside the convex part 34 and thus a diffused light of intense directivity can be obtained.

The top of the convex part 34 is formed into a plane 34A parallel with the light receiving surface 12. The smaller this plane is, the more part of an incident light is outputted through the side face 34, and therefore the amount of an output light outputted through the plane 34A does not become more than the amount outputted through the other part. Hereupon, as shown by an alternate long and two short dashes line in FIG. 7 for example, it is possible to more improve the directivity of a light outputted through the plane part 34A by providing the plane part 34A with a convex lens part 34B on it. And it is possible also to diffuse the light according to demand.

In case of diffusing a light, since a high directivity has been already obtained thanks to that the plane part 34A is small in area and an incident light reaches said plane part 34A, an output light outputted through the convex lens part 34B becomes a diffused light of intense directivity.

In case of this diffused light controlling optical sheet 31 of FIG. 7, in the same way as described above, it will do also to further increase a diffusion effect by distributing a fine material 18 inside the convex part 34, forming fine ruggedness on the side face 36, or coating a light diffusing material on the side face 36.

Figure 8:
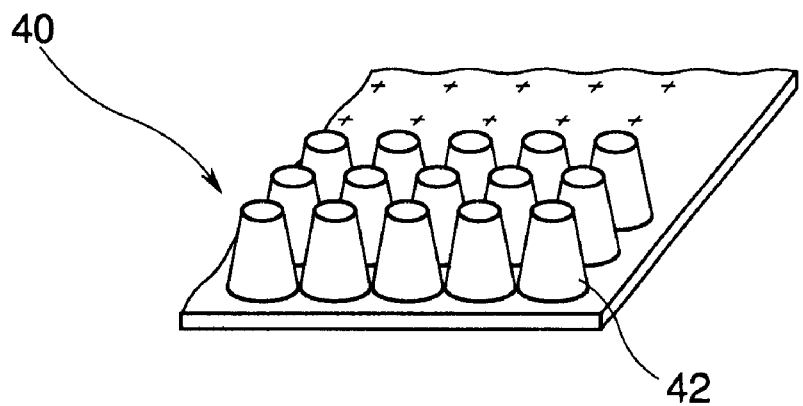
FIG. 8 is a perspective view showing an eighth example of the same embodiments.

Although the convex parts are formed in the shape of convex stripes being continuous in the direction perpendicular to their cross section in the above-mentioned diffused light controlling optical sheets, the present invention is not limited to this, but it will do also to form a convex part 42 into the shape of a frustum of a cone on a base film or in one body together with the light receiving surface so that the convex parts 42 are arranged successively in two directions, like a diffused light controlling optical sheet 40 shown in FIG. 8 for example. The convex part may be in the shape of a triangular pyramid, a quadrangular pyramid, a cylinder or the like.

Figure 9:
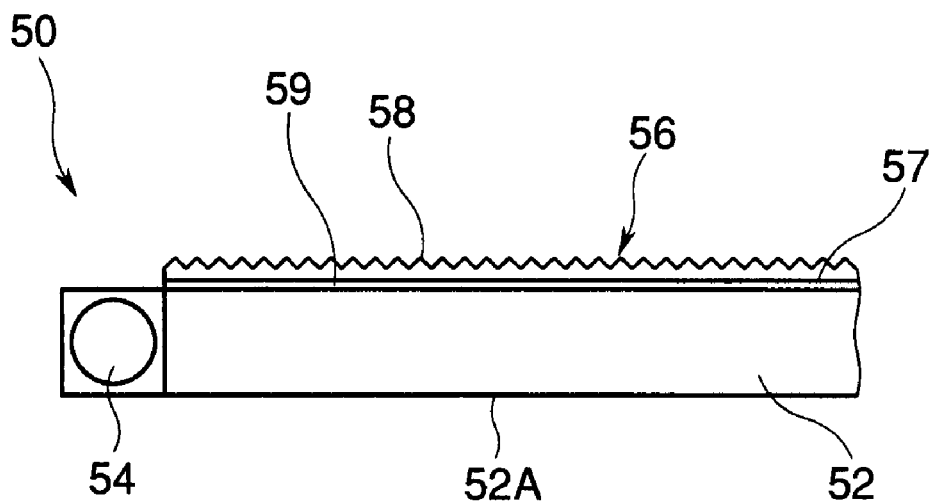
FIG. 9 is a roughly illustrating side view showing a back light device using a diffused light controlling optical sheet according to an example of the above-mentioned embodiments.

Next, an embodiment of a back light device according to the present invention shown in FIG. 9 is described.

This back light device 50 is composed of a light guide plate 52 made of a transparent plate, a light source 54 comprising a fluorescent tube disposed along one end edge of this light guide plate 52, and a diffused light controlling optical sheet 56 mounted along one flat surface of said light guide plate 52, wherein an illuminating light of the light source 54 introduced through the light guide plate 52 passes through said light guide plate 52 and enters the light receiving surface 57 of the diffused light controlling optical sheet 56 through an air layer 59 and then is emitted as a diffused light of intense directivity through the convex parts 58 at the opposite side.

It is assumed that one of said diffused light controlling optical sheets shown in FIGS. 1 to 8 is used as said diffused light controlling optical sheet 56. Symbol 52A of FIG. 9 indicates a light reflecting surface of the light guide plate 52.

Figure 10:
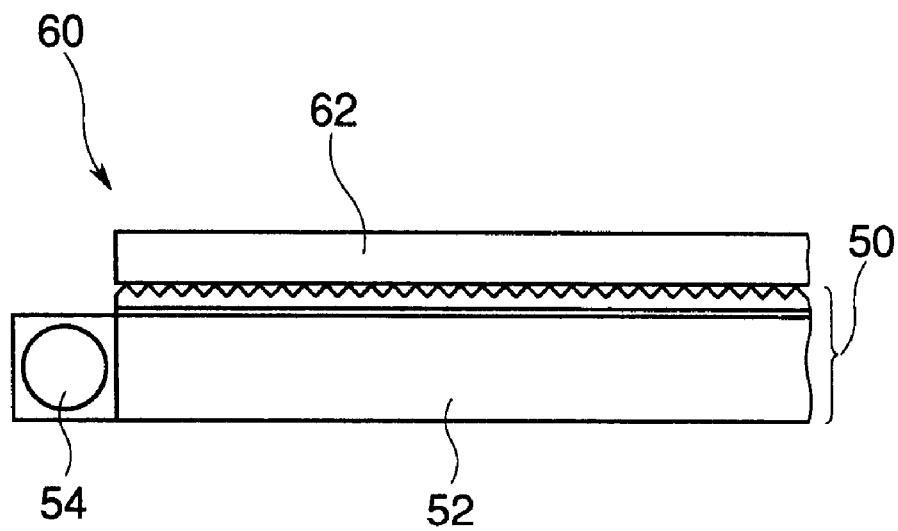
FIG. 10 is a roughly illustrating side view showing a liquid crystal display apparatus using the back light device shown in FIG. 9.

Next, a liquid crystal display apparatus using said back light device 50 is described with reference to FIG. 10.

This liquid crystal display apparatus 60 is composed of a liquid crystal panel 62 provided with said back light device 50 on the back of it.

In this liquid crystal display apparatus 60, since a back light obtained from the diffused light controlling optical sheet 56 is a diffused light of intense directivity, there is an advantage that its screen is very bright and has a wide angle of view.

Thanks to the above-mentioned composition, the present invention has an excellent effect that an output light outputted through the diffused light controlling optical sheet can be made into a diffused light of intense directivity.

And a back light device using such a diffused light controlling optical sheet as this becomes the optimum light source as a back light of a liquid crystal display apparatus for example.

Furthermore, in a liquid crystal display apparatus using such a back light device as this, there is an excellent effect that it is possible to make its screen bright and make its angle of view large.

What is claimed is:

1. A diffused light controlling optical sheet made of a light-transmissive material, wherein one face of the optical sheet is used as a light receiving surface of a plane shape and the other face of the optical sheet is used as a light outputting surface and provided with a plurality of convex parts, said convex part is provided with side faces extending from the top to the base, each of said side faces of said convex part being a plane making an angle of 60 to 90 degrees with said light receiving surface, at least one of said light-transmissive material, said side surface is provided with a light diffusing means including a portion with a fine material at the face of the optical sheet with a plurality of convex parts for converting a light inputted through said light receiving surface into a diffused light of intense directivity and outputting the diffused light through the light outputting surface, and said fine material is in particle diameter more than 0.5 $\mu$m and less than 10 $\mu$m.

2. A diffused light controlling optical sheet as defined in claim 1, wherein said light diffusing means is a fine material slightly different in refractive index from said light-transmissive material is distributed inside said convex parts and a light diffusion effect is obtained by a refractivity difference between said fine material and said light-transmissive material.

3. A diffused light controlling optical sheet as defined in claim 2, wherein said fine material is in particle diameter more than 0.5 $\mu$m and less than 10 $\mu$m, and preferably 1 $\mu$m or more and 5 $\mu$m or less.

4. A diffused light controlling optical sheet as defined in claim 1, wherein said light diffusing means is fine ruggedness being provided with said side face of said convex part.

5. A diffused light controlling optical sheet as defined claim 4, wherein the centerline average roughness of said fine ruggedness is 0.5 $\mu$m or more and less than 10 $\mu$m, preferably 1 to 5 $\mu$m, and more preferably 2 to 3 $\mu$m.

6. A diffused light controlling optical sheet as defined in claim 1, wherein said light diffusing means is a light diffusing material coated on said side faces of said convex parts.

7. A diffused light controlling optical sheet as defined in claim 6, wherein said light diffusing material comprises in a base a fine material which is different in refractive index from this base and is in particle diameter 0.5 μm or more and 10 μm or less, and preferably 1 to 5 μm.

8. A diffused light controlling optical sheet as defined in claim 1, wherein said convex parts are disposed at intervals of 1 to 500 μm.

9. A diffused light controlling optical sheet as defined in claim 1, wherein the top of said convex part is formed into the shape of a plane parallel with said light receiving surface.

10. A diffused light controlling optical sheet as defined in claim 1, wherein the top of said convex part is made into a convex lens part.

11. A diffused light controlling optical sheet as defined in claim 1, wherein said convex part is made so that the half width of intensity of its output light is within an angle range of 24 degrees or less.

12. A diffused light controlling optical sheet as defined in claim 1, wherein said light diffusing means are a fine material and fine ruggedness said fine material is slightly different in refractive index from said light-transmissive material, distributed inside said convex parts and a light diffusion effect is obtained by a refractivity difference between said fine material and said light transmissive material, and said fine ruggedness is provided on said side face of said convex part.

13. A diffused light controlling optical sheet as defined in claim 12, wherein said convex parts are disposed at intervals of 1 to 500 μm.

14. A diffused light controlling optical sheet as defined in claim 1, wherein said light diffusing means are a fine material and a light diffusing material, said fine material slightly different in refractive index from said light-transmissive material is distributed inside said convex parts and a light diffusion effect is obtained by a refractivity difference between said fine material and said light-transmissive material, and said light diffusing material is coated on said faces of said convex parts.

15. A diffused light controlling optical sheet as defined in claim 14, wherein said convex parts are disposed at intervals of 1 to 500 μm.

16. A back light device provided with a plane-shaped light source, wherein a diffused light controlling optical sheet is disposed so that the optical sheet's light receiving surface faces the light outputting surface of said plane-shaped light source with an air layer between them, the diffused light controlling optical sheet is made of a light-transmissive material, wherein the light receiving surface is a plane shape and the other face of the optical sheet is used as a light outputting surface and provided with a plurality of convex parts, said convex part is provided with side faces extending from the top to the base, each of said side faces of said convex part being a plane making an angle of 60 to 90 degrees with said light receiving surface, and at least one of said light-transmissive material and said side surfaces is provided with a light diffusing means including a portion with a fine material at the face of the optical sheet with a plurality of convex parts for converting a light inputted through said light receiving surface into a diffused light of intense directivity and outputting the diffused light through the light outputting surface, and said fine material is in particle diameter more than 0.5 μm and less than 10 μm.

17. A back light device provided with a plane-shaped light source, wherein a diffused light controlling optical sheet is disposed so that the optical sheet's light receiving surface faces the light outputting surfaces of said plane-shaped light source with an air layer between them, the diffused light controlling optical sheet is made of a light-transmissive material, wherein the light receiving surface is a plane shape and the other face of the optical sheet is used as a light outputting surface and provided with a plurality of convex parts, said convex part is provided with side faces extending from the top to the base, each of said side faces of said convex part being a plane making an angle of 60 to 90 degrees with said light receiving surface, a fine material slightly different in refractive index from said light-transmissive material is distributed inside said convex parts and a light diffusion effect is obtained by a refractivity difference between said fine material and said light-transmissive material, then converting a light inputted through said light receiving surface into a diffused light of intense directivity and outputting the diffused light through the light outputting surface, and said fine material is in particle diameter more than 0.5 μm and less than 10 μm.

18. A liquid crystal display apparatus provided with a back light device, using an output light from said back light device as a back light, the back light device provided with a plane-shaped light source, wherein a diffused light controlling optical sheet is disposed so that the optical sheet's light receiving surface faces the light outputting surface of said plane-shaped light source with an air layer between them, the diffused light controlling optical sheet is made of a light-transmissive material, wherein the light receiving surface is a plane shape and the other face of the optical sheet is used as a light outputting surface and provided with a plurality of convex parts, said convex part is provided with side faces extending from the top to the base, each of said side faces of said convex part being a plane making an angle of 60 to 90 degrees with said light receiving surface, at least one of said light-transmissive material and said side surface is provided with a light diffusing means including a portion with a fine material at the face of the optical sheet with a plurality of convex parts for converting a light inputted through said light receiving surface into a diffused light of intense directivity and outputting the diffused light through the light outputting surface, and said fine material is in particle diameter more than 0.5 μm and less than 10 μm.

19. A liquid crystal display apparatus provided with a back light device, using an output light from said back light device as a back light, the back light device provided with a plane-shaped light source, wherein a diffused light controlling optical sheet is disposed so that the optical sheet's light receiving surface faces the light outputting surface of said plane-shaped light source with an air layer between them, the diffused light-controlling optical sheet is made of a light-transmissive material, wherein the light receiving surface is a plane shape and the other face of the optical sheet is used as a light outputting surface and provided with a plurality of convex parts, said convex part is provided with side faces extending from the top to the base, each of said side faces of said convex part being a plane making an angle of 60 to 90 degrees with said light receiving surface, a fine material slightly different in refractive index from said light-transmissive material is distributed inside said convex parts and a light diffusion effect is obtained by a refractivity difference between said fine material and said light-transmissive material, then for converting a light inputted through said light receiving surface into a diffused light of intense directivity and outputting the diffused light through the light outputting surface, and said fine material is in particle diameter more than 0.5 μm and less than 10 μm.

* * * * *